Figure 4:
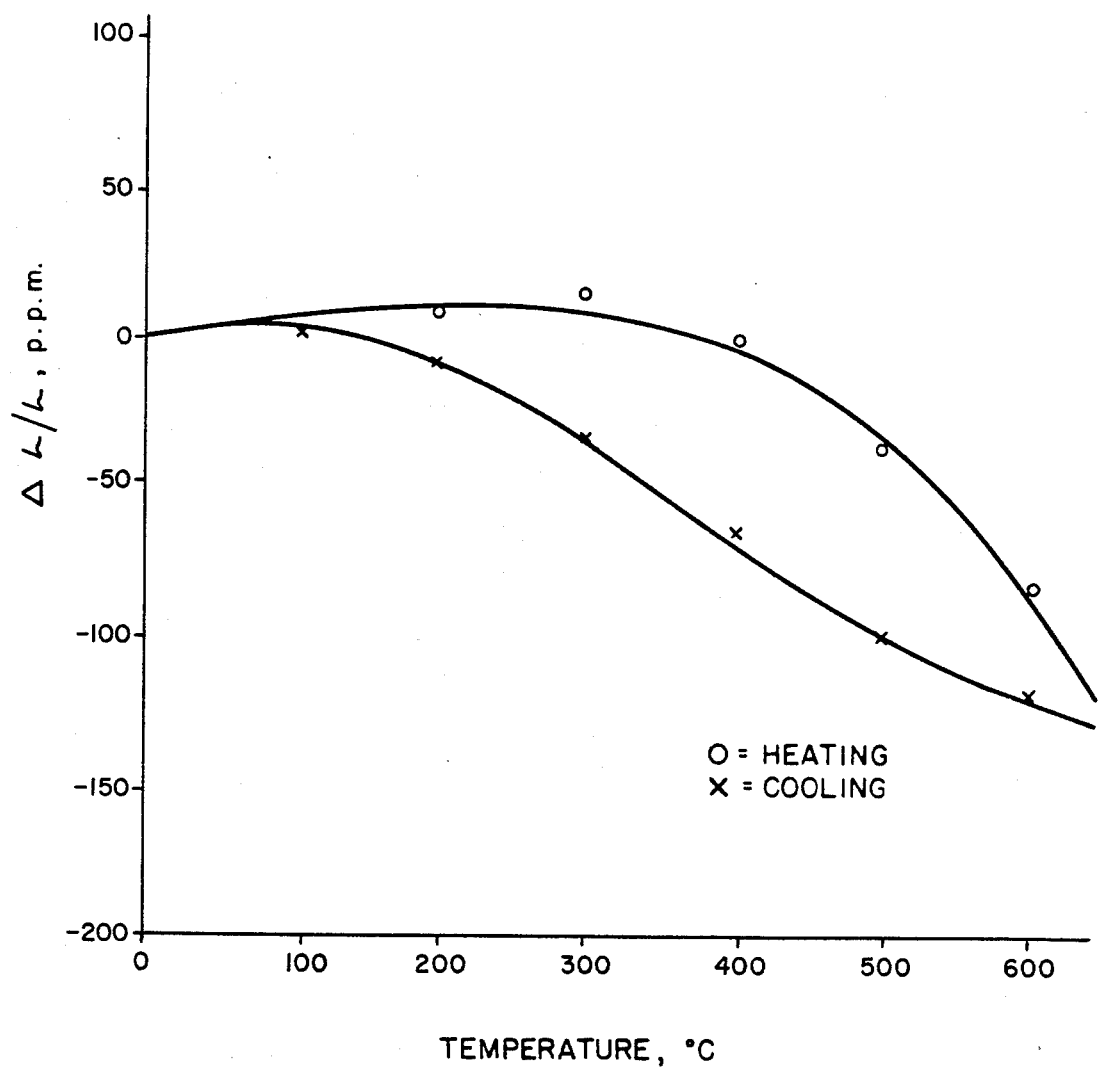

of [19]
United States Patent
Rittler

[11] 4,209,229
[45] Jun. 24, 1980

[54] GLASS-CERAMIC COATED OPTICAL WAVEGUIDES

[75] Inventor: Hermann L. Rittler, Corning, N.Y.

[73] Assignee: Corning Glass Works, Corning, N.Y.

[21] Appl. No.: 945,508

[22] Filed: Sep. 25, 1978

[51] Int. Cl.² .............................................. G02B 5/14
[52] U.S. Cl. .................... 350/96.34; 65/3 A; 65/33; 350/96.30
[58] Field of Search ............... 350/96.30, 96.31, 96.33, 350/96.34; 65/2, 3 R, 3 A, 12, DIG. 7, 33, 111

[56] References Cited

U.S. PATENT DOCUMENTS

| Re. 27,560 | 1/1973 | Achener | 65/3 A |
|---|---|---|---|
| T958,010 | 5/1977 | Eichenbaum et al. | 350/96.30 X |
| 2,920,971 | 1/1960 | Stookey | 106/39 |
| 2,998,675 | 9/1961 | Olcott et al. | 106/54 |
| 3,243,335 | 3/1966 | Faile | 106/47 R |
| 3,253,975 | 5/1966 | Olcott et al. | 428/410 |
| 3,352,656 | 11/1967 | McMillan et al. | 65/33 |
| 3,389,458 | 6/1968 | Ostrander et al. | 29/605 |
| 3,464,836 | 9/1969 | Pendleton et al. | 106/39.7 |
| 3,659,915 | 5/1972 | Maurer et al. | 350/96.30 |
| 3,711,262 | 1/1973 | Keck et al. | 65/3 A |
| 3,737,292 | 6/1973 | Keck et al. | 65/3 A |
| 3,785,834 | 1/1974 | Rapp | 350/96.34 X |
| 3,901,676 | 8/1975 | Heinze et al. | 65/33 |
| 4,042,362 | 8/1977 | MacDowell et al. | 65/33 |
| 4,118,211 | 10/1978 | Au Coin et al. | 65/3 R |

FOREIGN PATENT DOCUMENTS 1174474 12/1969 United Kingdom .

Primary Examiner—John K. Corbin
Assistant Examiner—John D. Lee
Attorney, Agent, or Firm—Clinton S. Janes, Jr.

[57] ABSTRACT

There are disclosed a composite optical waveguide characterized by a glass-ceramic coating over a vitreous waveguide member, and methods of producing this composite waveguide by drawing a glass coated waveguide and thermally crystallizing the glass coating.

8 Claims, 5 Drawing Figures

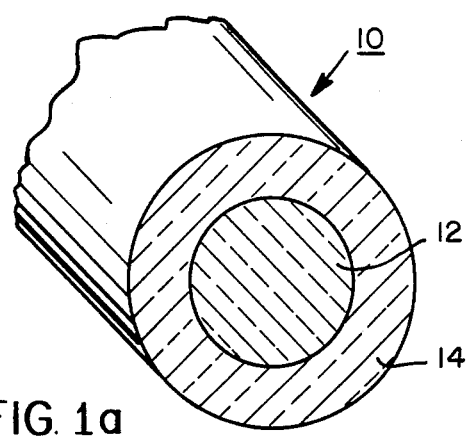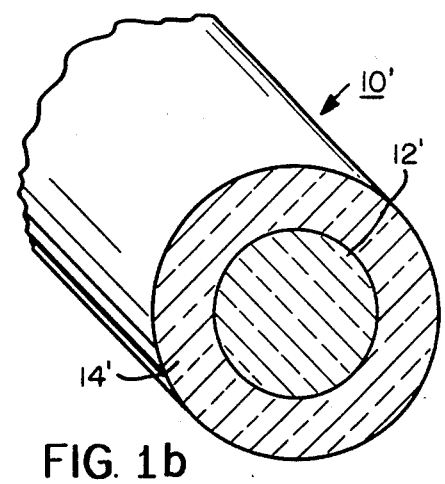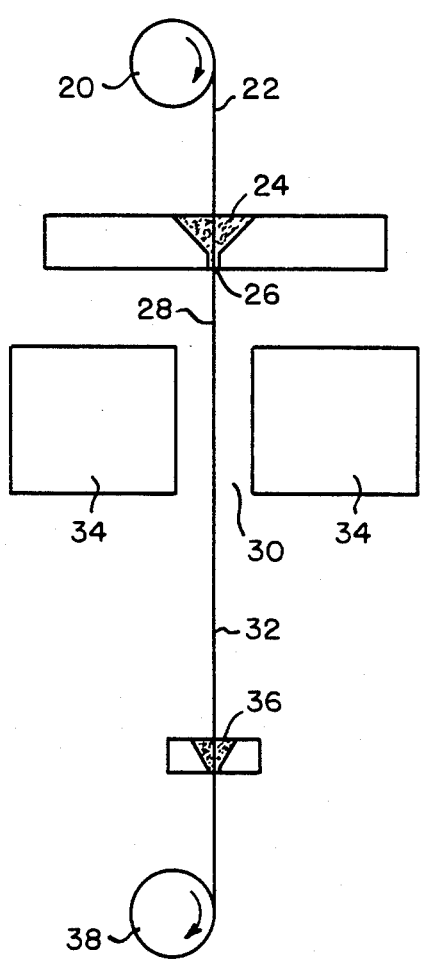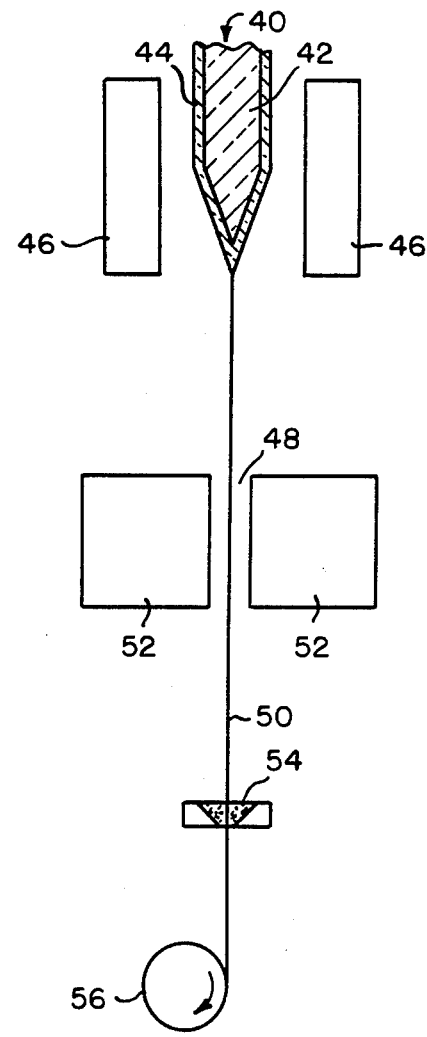
FIG. 1a (PRIOR ART)
FIG. 1b
FIG. 2
FIG. 3

4,209,229

GLASS-CERAMIC COATED OPTICAL WAVEGUIDES

BACKGROUND OF THE INVENTION

The invention is concerned with a novel optical filament for use in optical communication systems.

Structurally, an optical filament and an optical fiber are similar in that each is a composite of a light transmitting core, usually glass, and a compatible cladding of lower refractive index material. The refractive index differential causes light rays entering the core to be repeatedly refracted at the core-cladding interface, and thus travel the length of the core. However, the light attenuation level in an optical fiber is sufficiently high, due to impurities and imperfections in the glass, that an optical signal can be transmitted only a short distance. Even then the clarity is usually inadequate for optical communication.

Recent technical advances in glass forming and processing techniques have evolved glasses of such a low impurity level that optical signals can be transmitted over long distances without substantial loss or distortion. Optical filaments thus produced are commonly known as optical waveguides and hold great promise in the communications field. Decreasing production costs are opening broad areas of application for this new communications tool. As these new applications arrive, it becomes increasingly important to provide an optical waveguide having a rugged physical construction. This is necessary to both simplify initial installation procedures, and insure a long service life after installation. Thus, a waveguide filament of increased mechanical strength is needed, as well as one having good resistance to environmental conditions, especially atmospheric moisture. It would be particularly desirable, from a production standpoint, to provide such service characteristics within the beneficial framework of a continuous filament drawing and processing procedure.

Presently available optical waveguide filaments are composed of a glass core, e.g., a doped fused silica, and a glass cladding, e.g., a fused silica or glass of similar characteristics. Such known composites have been processed to provide exceptionally good optical characteristics in the core member, thus providing a sound technical basis for use as a communications medium.

It is recognized, however, that, despite its great theoretical strength, glass is still a relatively fragile material in practice due to surface microcracking. Further, numerous studies have shown that moisture can be adsorbed on a glass surface and react with the silica in such surface by hydration. This leads to development of localized stress in the surface and further opening of the microcracks. Obviously, this is a continuing cycle which ultimately seriously diminishes the effectiveness of a silicate glass coating or cladding.

A glass-ceramic material is the polycrystalline product of uniform, internal, in situ crystallization of a glass by heat treatment. It has been shown that these materials are frequently stronger mechanically than their parent glasses. Studies have also shown that at least some glass-ceramics are less prone to water attack than their parent glasses.

It would then be desirable to utilize these advantageous features of glass-ceramics in the encasing of optical waveguides. However, certain rather basic considerations have made this seem quite impractical.

A major concern is that optical filaments are customarily produced by forming a blank or preform of the composite in the shape of a rod, or cylinder, heating at least a zone of such blank to drawing temperature, and then drawing in usual filament forming manner. However, inasmuch as a glass-ceramic is characterized by a rather rigid crystalline structure, such drawing procedure is inapplicable to a glass-ceramic material.

It would, of course, be possible to produce the encasing glass-ceramic from a glass that could be thermally crystallized to a glass-ceramic state. However, glasses frequently undergo rather large changes in coefficient of thermal expansion during conversion to the glass-ceramic state. Thus, while the ultimate expansion match, or controlled mismatch, in the glass-ceramic state may be satisfactory, it may be quite impractical to produce a seal between the glasses. For these and other reasons then, a glass-ceramic protective and strengthening outer coating has not been considered practical for a waveguide.

PURPOSE OF THE INVENTION

It is the basic purpose of the invention to solve the problems expressed above and thereby provide an improved optical waveguide. A particular purpose is to improve the mechanical strength of optical waveguide filaments and also impart good resistance to moisture attack. A further purpose is to provide an optical waveguide filament having a glass-ceramic protective and strengthening outer layer. Another purpose is to provide a method of thermally crystallizing a glass layer to a glass-ceramic as part of a continuous filament drawing operation.

SUMMARY OF THE INVENTION

One aspect of the present invention is an improved optical waveguide filament comprising a core member composed of a vitreous material consisting of one or more component oxides, a vitreous cladding layer having a refractive index below that of the core material, and a protective and strengthening outer layer, the improvement being a glass-ceramic outer layer wherein the average crystal size is below about five (5) microns. Preferably, the primary crystal phase in the glass-ceramic layer is a solid solution of beta-eucryptite.

The invention further contemplates a method of producing such a filament wherein there is drawn a radially laminated glass filament composed of a vitreous core and cladding layer and a $Li_2O$-$Al_2O_3$-$SiO_2$-$TiO_2$ type glass outer layer capable of being crystallized by thermal treatment. The method is characterized by heat treating the drawn composite filament for less than one minute at a temperature in the range of 700°–1400° C. to develop a beta-eucryptite crystal phase in the outer glass layer wherein the average crystal size is less than 5 microns. The composite glass filament, prior to its crystallization, may be drawn by forming a large laminated body consisting of core glass, cladding glass, and outer layer glass, in proper relationship, heating the body to drawing temperature, and drawing the composite filament. Alternatively, a preformed waveguide filament may be drawn through a molten bath of outer layer glass to apply the outer layer of thermally crystallizable glass thereto.

PRIOR ART

Optical waveguides produced from fused silica type glasses are described in U.S. Pat. No. 3,659,915 granted May 2, 1972 to R. D. Maurer and P. C. Schultz. Methods of producing such waveguides by forming composite glass preforms and drawing optical filaments from such preforms are disclosed in U.S. Pat. No. 3,711,262, granted Jan. 16, 1973 to D. B. Keck and P. C. Schultz, and U.S. Pat. No. 3,737,292, granted June 5, 1973 to D. B. Keck et al.

U.S. Pat. No. Re. 27,560, granted Jan. 23, 1973 to C. Achener, discloses devitrifying the core of a coaxial fiber to increase strength by developing compressive stress in the glass cladding or outer layer.

A number of U.S. Patents has disclosed the devitrification or crystallization of a surface layer on an integral body composed of a single glass as a means of strengthening the body. Typical of such patents are U.S. Pat. Nos. 2,998,675 and 3,253,975, granted Sept. 5, 1961 and May 31, 1966, respectively, to J. S. Olcott and S. D. Stookey. These patents disclose forming a crystallized surface layer containing beta-eucryptite crystals. In contrast, U.S. Pat. No. 3,243,335, granted Mar. 29, 1966 to S. P. Faile, describes heating the interior of a glass body by dielectric or induction heat to produce a crystallized interior with a vitreous exterior layer in compression.

United Kingdom Pat. No. 1,174,474 of English Electric Company Ltd., published Dec. 17, 1969, describes applying a zinc phosphate glass coating to a metal wire and then heat treating the glass coating to convert it to a glass-ceramic. U.S. Pat. No. 3,389,458, granted June 25, 1968 to G. W. Ostrander and W. W. Pendleton, describes applying a glass frit to an electrical conductor and thereafter crystallizing the glass coating. U.S. Pat. No. 3,464,836, granted Sept. 2, 1969 to the same inventors, describes drawing a glass filament, wrapping a conductor with such filament, and then crystallizing the filament.

U.S. Pat. No. 4,042,362, granted Aug. 16, 1977 to J. F. MacDowell and H. L. Rittler, describes a rapid ceramming procedure for glass bodies and reviews prior literature on the subject.

THE DRAWING

In the attached drawing,

FIGS. 1a and 1b are perspective views, greatly enlarged, of simple forms of an optical waveguide filament, FIG. 2 is a schematic drawing illustrating a system for producing a composite filament in accordance with the present invention, FIG. 3 is a schematic drawing of an alternative system for producing a composite filament in accordance with the invention, and FIG. 4 is a graphical illustration of coefficient of thermal expansion values for a coating material in accordance with the invention.

GENERAL DESCRIPTION

Referring to the drawing, FIG. 1a illustrates a simple form of optical waveguide filament 10, composed of a solid, vitreous core member 12 and a cladding layer 14 of a different glass. Typically, the core may be fused silica doped with an oxide such as germania or titania, while the cladding may be pure fused silica. In any event, the effectiveness of the glass composite for optical transmission requires that the refractive index of the cladding glass be lower than that of the core glass.

FIG. 1b illustrates an optical waveguide filament 10' in accordance with the present invention. Filament 10' is composed of a waveguide member 12' and a protective and strengthening outer layer 14'. Waveguide member 12' in the present construction may, for example, be a doped fused silica as in core 12 with a cladding layer of pure silica. Alternatively, it may be any other, extremely pure, fused oxide or oxide combination known to be suitable for the purpose and compatible with outer coating layer 14' as hereafter described.

The characteristic feature of the present invention is outer layer 14' which is composed of a layer or coating of glass-ceramic material, that is, a material having a poly-crystalline phase and being produced from a glass by internal crystallization in situ. The particular glass-ceramic employed will be selected on the basis of physical property characteristics. It is desirable that outer layer 14' have a somewhat lower thermal expansion coefficient than waveguide 12' in order that strengthening compressive stresses may develop when the composite is cooled. Also, the precursor glass of outer layer 14' should be chemically compatible with the cladding glass of the waveguide filament to avoid any undesirable chemical or physical contamination, as by ion exchange or other chemical or physical interaction. Finally, the precursor glass must be readily melted and applied as a layer prior to the heat treating step in which it is converted to the glass-ceramic state.

I have found that lithia-alumina-silica type glasses, particularly those having stoichiometries, on a mole ratio basis, in the range of 1 $Li_2O$:0.5–1.5 $Al_2O_3$:2.0–4.5 $SiO_2$, are particularly adapted for use with the fused silicas and other cladding materials presently available. When these lithium aluminosilicate glasses are cerammed, that is, heat treated to produce nucleated crystallizations, the dominant crystal phase developed is either beta-eucryptite or beta-quartz solid solution. The former is particularly desirable because of its extremely low thermal coefficient of expansion, negative values usually being reported for these materials. Also, beta-eucryptite type glass-ceramics are known to undergo densification during heat treatment, a phenomenon which also tends to increase the strength of a cladding layer produced from such material.

A particular feature of the present invention is that the crystalline phase developed in outer layer 14' is fine grained. This is necessitated by the fact that the outer coating layer is normally less than 250 microns in thickness. It is also necessitated by the desire to achieve as much flexibility and resilience in the filament as possible without danger of cracking, features unattainable with relatively large crystal sizes. In general, the crystals in the outer layer should be below five (5) microns in diameter and preferably below 7,000 Å so that the cladding is transparent.

I have found that the lithium aluminosilicate glasses described above can be cerammed to develop the desired fine-grained crystal phases by heat treating a coated filament within the temperature range of 700°–1400° C. for a time not exceeding one minute. The heat treating cycle preferably is for a time of 2 to 10 seconds at a temperature in the range of 1000° to 1300° C. Below 700° C., crystallization occurs slowly and there is a tendency to develop larger size crystals which, as pointed out earlier, interfere with resilience of the composite filament. At temperatures above 1400° C., the crystal phase tends to remelt and revert to a glassy amorphous form.

The development of a fine-grained crystal phase is favored by heat treating for relatively short times at higher temperatures. It is also favored by a relatively high content of nucleating agent in the glass. Thus, when titania (TiO$_2$) is used as a nucleating agent, I have found it desirable to incorporate from 2 to 25% by weight of this oxide in the outer layer glass. Other known nucleating agents may be employed to the extent that they are otherwise compatible in the composite and for the purpose. In particular, I find it desirable to use the precious metals such as platinum, palladium, and ruthenium.

Various techniques are available for producing the composite optical waveguide construction of the present invention. Initially, the composite filament must be produced as a glass encased filament, since the drawing operation cannot be carried out once the glass has been crystallized. FIGS. 2 and 3 schematically illustrate two convenient techniques which I have devised for drawing a glass encased filament and ceramming the glass outer layer in a continuous operation.

FIG. 2 shows a hot lamination process wherein a waveguide filament 22 is unwound from a drum or spool 20, for example, and drawn through a molten bath 24 of outer layer glass and thence through orifice 26. The latter is of such size and so arranged as to deliver waveguide filament 22 with an outer glass layer of suitable thickness coated thereon. The radially-laminated, coated waveguide 28 thus produced is now passed through a suitable reheating zone 30, provided by heating elements 34, where the ceramming (crystallizing) step takes place. Reheating zone 30 may be provided by a tubular heater, opposed radiant heaters, or other suitable arrangement to provide a zone of desired temperature. The length of the reheating zone will be determined by the length of the heating cycle desired and the speed at which the filament is being drawn.

Glass-ceramic coated filament 32, produced from glass coated filament 28 during passage through reheating zone 30, is now ready for further processing which forms no part of the present invention. For example, as shown, filament 32 may be passed through an organic coating bath 36 and then wound on a drum or spool 38 preparatory to further use.

FIG. 3 illustrates an alternative system wherein a glass-coated filament is drawn from a preformed, composite glass blank which may have been produced by a procedure such as described in earlier mentioned U.S. Pat. No. 3,711,262 or in U.S. Pat. No. 3,737,292, reference being made to those patents for further details regarding their respective procedures.

It will be appreciated that the composite glass blanks may have to be maintained at an elevated temperature to avoid stress problems if expansion characteristics of the glass differ sufficiently.

Composite glass blank 40, as shown, consists of a glass waveguide preform 42 and a glass outer layer 44. This blank is thermally softened as by heaters 46 in accordance with standard glass redraw practice. It is customary to redraw blank 40 at a temperature in the range of 1500° to 2000° C. with the layer melting at 1000° to 1800° C. Thus, depending on the particular temperature chosen, the outer layer may almost instantaneously ceram or may require a short heat treatment between 700° and 1400° C.

The ceramming heat treatment is applied to the drawn composite filament as in FIG. 2. Thus, reheating zone 48 corresponds to zone 30 of FIG. 2, and may be supplied by heating elements 52 such as a tubular heater, opposed radiant heaters, or the like. Likewise, as cerammed filament 50 leaves reheating zone 48, it may be coated with organic lubricants in bath 54 and wound on a storage drum 56 as before.

A further alternative procedure, whereby an even finer grained crystal phase may be developed in the outer layer on an optical waveguide filament, involves converting the characteristic reheating, or ceramming, zone into several reheat zones or heating pulses of short duration. Thus, instead of subjecting the composite filament to a single heat treatment of 20 seconds, for example, it may be subjected to four separate reheat cycles each of five seconds duration. This may be conveniently achieved with a pulsed heat source such as a laser beam.

The general principles of pulsed heat treatment, and the results thereby achieved, are described and claimed in my application Ser. No. 945,506, entitled "Method of Producing a Glass-Ceramic", and filed of even date herewith. In general, it has been observed that the same total heat treating time at any given temperature produces smaller size crystals, and hence a more resilient filament, when a pulsed type heat treatment is employed. It is my belief that the heating and cooling cycles which occur in such a heat treatment tend to develop more nuclei in the outer layer glass and thus promote more and smaller crystals.

It is believed that a glass-ceramic material provides a stronger, more durable coating for the glass cladding of an optical waveguide filament than the previously used glass, metal, or plastic materials. As noted earlier, the maintaining of a proper differential in coefficients of thermal expansion between the glass cladding material and the outer coating material will promote the development of compressive stresses which enhance mechanical strength of the composite filament. Further, it is known that glass-ceramic materials are impermeable to moisture and other atmospheric constituents which might have an adverse influence on the glass cladding. Finally, the characteristic cycle of moisture attack on fine cracks which inherently develop in a vitreous surface, followed by stress development during glass hydration, and then by further opening of the glass cracks, is much less prevalent in glass-ceramic materials. It is believed that the glassy phase in a glass-ceramic material is much less prone to moisture attack, and that any cracks which do develop tend to run into crystals and to be stopped at that point, rather than continuing on to the underlying core glass.

SPECIFIC DESCRIPTION

Table I sets forth the compositions of several glasses suitable for use in producing the outer protective and strengthening layer of the present invention. The compositions are grouped first in terms of oxide mol ratios as calculated from the glass batch, and then in parts by weight. Since the latter equal or closely approximate 100 in total, the compositions there may be considered as being essentially reported in terms of percent by weight.

TABLE I

|   | SiO$_2$ | Al$_2$O$_3$ | Li$_2$O | TiO$_2$ | ZrO$_2$ |
| --- | --- | --- | --- | --- | --- |
| 1. | 2.5 | 1.0 | 1.0 | 0.16 | — |
| 2. | 2.5 | 1.0 | 1.0 | 0.31 | — |
| 3. | 2.5 | 1.0 | 1.0 | 0.39 | — |
| 4. | 2.5 | 1.0 | 0.8 | 0.16 | — |
| 5. | 2.5 | 1.0 | 0.8 | 0.31 | — |
| 6. | 2.5 | 0.6 | 1.0 | 0.27 | — |
| 7. | 2.5 | 1.4 | 1.0 | 0.36 | — |

TABLE I-continued

| | | | | |
|---|---|---|---|---|
| 8. | 2.0 | 0.6 | 1.0 | 0.12 | — |
| 9. | 2.0 | 0.6 | 1.0 | 0.29 | — |
| 10. | 2.5 | 1.0 | 0.8 | 0.17 | 0.04 |

| | $SiO_2$ | $Al_2O_3$ | $Li_2O$ | $TiO_2$ | $ZrO_2$ |
|---|---|---|---|---|---|
| 1. | 50.9 | 34.6 | 10.1 | 4.4 | — |
| 2. | 48.8 | 33.3 | 9.8 | 8.1 | — |
| 3. | 47.9 | 32.6 | 9.6 | 9.9 | — |
| 4. | 51.9 | 35.3 | 8.3 | 4.5 | — |
| 5. | 49.8 | 33.9 | 8.0 | 8.3 | — |
| 6. | 57.0 | 23.2 | 11.4 | 8.4 | — |
| 7. | 42.6 | 40.7 | 8.5 | 8.2 | — |
| 8. | 54.4 | 27.6 | 13.6 | 4.4 | — |
| 9. | 51.4 | 26.0 | 12.8 | 9.8 | — |
| 10. | 50.9 | 34.7 | 8.1 | 4.6 | 1.7 |

Each of the compositions in Table I includes titania ($TiO_2$) as a nucleating agent, and the effect of varying the amount of this oxide may be seen from data presented subsequently. For various reasons, I prefer to use a noble metal as nucleating agent and the continuation of Table I below sets forth exemplary compositions in the same manner as Table I above.

TABLE I (Concluded)

| | $SiO_2$ | $Al_2O_3$ | $Li_2O$ | Metal |
|---|---|---|---|---|
| 11. | 3 | 1 | 1 | 0.0002 Ru |
| 12. | 2.5 | 1 | 1 | 0.0002 Ru |
| 13. | 2 | 1 | 1 | 0.0005 Pd |
| 14. | 2 | 1 | 1 | 0.0002 Pt |

| | $SiO_2$ | $Al_2O$ | $Li_2O$ | Metal |
|---|---|---|---|---|
| 11. | 57.9 | 32.5 | 9.6 | .015 Ru |
| 12. | 53.5 | 36.0 | 10.5 | .015 Ru |
| 13. | 47.5 | 40.5 | 11.9 | .05 Pd |
| 14. | 47.6 | 40.5 | 11.9 | .03 Pt |

A batch corresponding to each of the compositions in Table I was formulated and mixed using conventional glass making raw materials, with care being taken to maintain high purity in the batch. The batches thus produced were placed in crucibles and melted in electric furnaces at 1500° C. to produce homogeneous melts from which glass fibers were drawn. The fibers drawn were then subjected to controlled heat treatments, varying in time and temperature, with the appearance of the resulting product being observed. Also, powder X-ray determinations were made to identify the dominant crystal phase developed in the fiber by the heat treatment.

The expedience of drawing and heat treating fibers is considered to be a valid technique for screening compositions for coating purposes in accordance with the present invention. Thus, ease of fiber formation and quality of the fiber formed, in combination, are believed to provide a good guide as to the behavior of a glass as a coating material in a drawing process such as used in formation of optical wave-guide filaments. Also, the thickness of a glass fiber may be analogous to the thickness of a glass coating layer and hence should manifest similar ceramming characteristics.

Table II records the time and temperature of the heat treatment employed for the fibers from each example of Table I. It further includes observations of the fiber after heat treatment.

TABLE II

| | Heat Treatment | | | |
|---|---|---|---|---|
| | Time (secs) | Temp.(°C.) | Crystal Phase | Appearance |
| 1. | 60 | 850 | BE | Transparent |
| 2. | 2 | 1300 | BE + $TiO_2$ | Transparent |
| 3. | 5 | 1250 | — | Opaque |
| 4. | 30 | 1000 | BE + Gl | Transparent |
| 5. | 10 | 1000 | BE | Transparent |
| 6. | 10 | 900 | BE | Transparent |
| 7. | 10 | 1000 | BE | Transparent |
| 8. | 15 | 800 | BE + Gl. | Transparent |
| 9. | 5 | 1100 | Gl + BE | Transparent |
| 10. | 15 | 1000 | BE + Gl. | Transparent |
| 11. | 4 | 1250 | BQ | Transparent |
| 12. | 3 | 1250 | BQ | Transparent |
| 13. | 5 | 1250 | BE | Transparent |
| 14. | 2 | 1250 | BE | Transparent |

CODE: BE = beta-eucryptite; BQ = beta-quartz; Gl. = glass

The following example illustrates the type of material match contemplated in the invention. A coating of glass, having the composition of Example 2 in Table I, was formed on a piece of 96% silica tubing. This glass has physical characteristics very similar to the fused silica commonly used in glass optical waveguides.

A gather of molten glass was applied around the outside wall of the 96% silica tube, while keeping the composite in a flame. This was necessary because the 96% silica glass has a nominal coefficient of thermal expansion of about $8 \times 10^{-7}$/°C. over the range of 0°–300° C., whereas the glass of Example 2 has a much higher expansion value, i.e., on the order of $100 \times 10^{-7}$/°C. over the same temperature range.

The composite was then further heated to a drawing temperature of about 1200° C. and drawn to form a filament in accordance with the construction of an optical waveguide. This filament was then heated for one minute at 1500° C. to ceram the glass coating by development of a polycrystalline beta-eucryptite crystal phase throughout its mass.

The composite filament was then heated to 600° C. at the rate of 600° C./hour, and cooled from that temperature at the same rate. Differential stress measurements were made to determine, by reference to the known values for the 96% silica glass, the expansion characteristics of the cerammed coating. Calculations show an average expansion coefficient ($\Delta L/L/$°C.) on heating of $-1.4 \times 10^{-7}$ and, on cooling, of $-2.0 \times 10^{-7}$, both over the range of 0° to 600° C. These values are approximately ten units below the silica glass, a differential considered optimum for strengthening, and typical of a beta-eucryptite glass-ceramic.

FIG. 4 shows in a graphical presentation the several expansion values calculated on the basis of measurements made on the composite.

I claim:

1. An optical waveguide composite filament comprising a waveguide member and an outer coating layer, the waveguide being a vitreous material composed of one or more oxides, and the outer coating layer having a thickness up to about 250 microns and being composed of a glass-ceramic material wherein the primary crystal phase is selected from the group of beta-eucryptite solid solution and beta-quartz solid solution and the average crystal size is below 7000 Å so that said coating layer is transparent.

2. An optical waveguide composite filament in accordance with claim 1 wherein the outer coating layer is composed essentially, on a calculated oxide basis in mol ratio, of 1 mol $Li_2O$, 0.5–1.5 mols $Al_2O_3$ and 2.0 to 4.5 mols $SiO_2$.

3. A method of producing an optical waveguide composite filament which comprises drawing a radially laminated filament composed of a vitreous waveguide preform and a glass outer coating capable of being crystallized to a glass-ceramic by heat treatment, heat treating the composite for less than a minute to develop a polycrystalline phase in the outer coating having a crystal size less than 5 microns.

4. A method according to claim 3 wherein the outer coating layer is a $Li_2O$-$Al_2O_3$-$SiO_2$-$TiO_2$ type glass and the crystalline phase formed is a beta-eucryptite or beta-quartz solid solution.

5. A method according to claim 3 wherein the waveguide is initially drawn as a vitreous filament, the filament is drawn through a bath of thermally crystallizable glass to form a vitreous outer coating of predetermined thickness on the filament, the coated filament is drawn through a zone in which the coated filament is heated within the range of 700°–1400° C. for less than one minute to cause crystallization of the outer coating.

6. A method according to claim 5 wherein the crystallizable glass is composed essentially, on a calculated oxide basis in mol ratio, of 1 mol $Li_2O$, 0.5–1.5 mols $Al_2O_3$ and 2.0–4.5 mols $SiO_2$.

7. A method according to claim 5 wherein the heat treatment is in the range of 1000° to 1300° C.

8. A method according to claim 3 wherein an integral, cylindrically laminated blank is formed, an internal portion of the blank is composed of a vitreous waveguide and an external portion is composed of a glass that is thermally crystallizable to a glass-ceramic, the blank is thermally softened and drawn into filament form, the filament is exposed to a temperature in the range of 700°–1400° C. for a time less than one minute to form a polycrystalline phase in said external portion wherein the crystals are less than 5 microns in size.

* * * * *

UNITED STATES PATENT AND TRADEMARK OFFICE
CERTIFICATE OF CORRECTION

PATENT NO. : 4,209,229
DATED : June 24, 1980
INVENTOR(S) : Hermann L. Rittler

It is certified that error appears in the above-identified patent and that said Letters Patent are hereby corrected as shown below:

Column 5, line 59, between "the" and "layer" insert -- outer --.

Column 7, line 56, change "wave-guide" to -- waveguide --.

Signed and Sealed this

Eighteenth Day of November 1980

[SEAL]

Attest:

SIDNEY A. DIAMOND

Attesting Officer

Commissioner of Patents and Trademarks